United States Patent [19]

Spruit et al.

[11] Patent Number: 5,321,682
[45] Date of Patent: Jun. 14, 1994

[54] METHOD OF AND DEVICE FOR RECORDING INFORMATION ON A RECORD CARRIER HAVING A RECORDING LAYER WHICH, WHEN HEATED, UNDERGOES AN OPTICALLY DETECTABLE CHANGE

[75] Inventors: Johannes H. M. Spruit; Bernardus A. J. Jacobs; Wilhelmus H.A.M. Bardoel, all of Eindhoven, Netherlands

[73] Assignee: U.S. Philips Corporation, New York, N.Y.

[21] Appl. No.: 973,443

[22] Filed: Nov. 9, 1992

[30] Foreign Application Priority Data

May 13, 1992 [EP] European Pat. Off. ......... 92201361.0

[51] Int. Cl.$^5$ ............................................. G11B 21/10
[52] U.S. Cl. ..................................... 369/116; 360/114
[58] Field of Search ................. 369/116, 100, 99; 360/114

[56] References Cited

U.S. PATENT DOCUMENTS

| | | | |
|---|---|---|---|
| 4,894,816 | 1/1990 | Sukeda et al. | 369/116 |
| 5,128,910 | 7/1992 | Iida | 360/114 |
| 5,182,742 | 1/1993 | Ohmori et al. | 369/116 |

OTHER PUBLICATIONS

"Japanese Journal of Applied Physics" vol. 28, Supplement 28-3, pp. 367-370 and pp. 371-374.

Primary Examiner—Paul M. Dzierzynski
Assistant Examiner—Don Wong
Attorney, Agent, or Firm—Richard A. Weiss

[57] ABSTRACT

Method of and device for recording information on a record carrier having a recording layer by scanning the recording layer with a radiation beam whose power has a pulsatory variation, including radiation pulses of high power, each having decreasing power, relative to and alternating with radiation intervals of low power, each having increasing power. As a result of the heat produced by the radiation pulses, the recording layer undergoes an optically detectable change. A write signal generating circuit converts an information signal into a write signal having a pulsatory pattern, including pulses of high signal values relative to and alternating with intervals of low signal values. A control circuit sets the power of the radiation beam to values fixed by the signal values of the write signal. The signal values of each of the pulses of the write signal decrease and the signal values of each of the intervals of the write signal increase. As a result, the power of the radiation beam decreases during the radiation pulses and increases during the radiation intervals, and the influence exerted by previous radiation pulses on the temperature at the scanning area is taken into account.

27 Claims, 4 Drawing Sheets

METHOD OF AND DEVICE FOR RECORDING INFORMATION ON A RECORD CARRIER HAVING A RECORDING LAYER WHICH, WHEN HEATED, UNDERGOES AN OPTICALLY DETECTABLE CHANGE

BACKGROUND OF THE INVENTION

The invention relates to a method of recording information on a record carrier having a recording layer in which an optically detectable change can be realized by heating the recording layer. In accordance with the recording layer is scanned by means of a radiation beam whose power is modulated in a pulse pattern related to the information to be recorded, the pulse pattern having radiation pulse which have high power alternating with intervals which have a low power level, the power within each radiation pulse decreasing in order to compensate for the temperature rise caused by the power applied to the recording layer during the previous part of that radiation pulse.

The invention also relates to a device for recording information on a record carrier having a recording layer in which an optically detectable change can be realized by heating the recording layer. The device comprises a radiation source for generating a radiation beam, a scanner for scanning the recording layer by means of the radiation beam, a write signal generating circuit for converting an information signal to be recorded into a write signal having a pulse pattern, the pulse pattern having pulses which have high signal levels (i.e., values) alternating with intervals which have a low signal level (i.e., values) the signal levels (i.e., values) within each pulse decreasing, and a control circuit for setting the instantaneous value of the power of the radiation beam at each instant to a value which is fixed by the instantaneous signal level (i.e., value) of the write signal.

A method and device of the type described in the opening paragraphs are known from U.S. Pat. No. 4,894,816. In the known method and device, the recording layer is scanned by means of a radiation beam in the form of a laser beam whose power is modulated in a pulsatory manner. During each radiation pulse, the recording layer is heated above a write temperature above which the recording layer undergoes an optically detectable change. During the intervals, the temperature in the recording layer drops below the write temperature. Thus, an information pattern of areas having changed optical properties is obtained. The initial value of each radiation pulse is exponentially dependent on the length of the previous interval. Within the radiation pulse itself the power decreases exponentially as a function of time. Thus during the formation of areas having changed properties, the temperature in the scanned portion of the recording layer is maintained at substantially the same level, which means that the dimensions of the areas provided are well defined. The jitter in the read signal during reading of an information pattern which consists of such areas with optically detectable changes is then small, which renders a high information density on the record carrier possible. In the known method the power of the radiation pulse is constant during the intervals.

SUMMARY OF THE INVENTION

When recording information by means of a laser beam having a modulated radiation power, the aim is a method in which the peak power of the radiation beam will not become needlessly high. In fact, the lifetime of the laser is negatively influenced by the use at higher powers.

The invention has, inter alia, for its object to provide means with which lower peak powers in the modulated radiation beam are sufficient during the recording operation.

In a method as described in the opening paragraph, this object is achieved in that the power increases within each interval in order to maintain the temperature at the scanning area at a more uniform level within the intervals. In a device as described in the opening paragraph, this object is achieved in that the write signal generating circuit is adapted to generate a write signal with increasing signal values which increases within each interval.

Consequently, the temperature at the end of each interval will have decreased to a lesser extent than in the prior-art method. As a result, a lower value will be sufficient for the initial value (peak value) of the power of each next radiation pulse. In fact, due to the higher temperature at the end of the interval, each temperature difference to be bridged has been reduced. Moreover, a better compensation of the temperature influence is obtained, because the temperature influence of the radiation pulses and of the intervals is compensated for.

An embodiment of the method of the invention is characterized in that a bivalent square-wave control signal for setting the radiation power during scanning is generated, and a measure (i.e., an adaption signal indicative) of the influence of the variation of the radiation power on the temperature at the scanning area is determined on the basis of this bivalent square-wave control signal. The bivalent square-wave control is then adapted in dependence upon the adaption signal determined to produce an adapted control signal and the power of the radiation beam is set during scanning to values which correspond to the signal values of the adapted control signal. This embodiment has the advantage that the influence of the complete previous pulse pattern on the temperature at the scanning area can be compensated for.

This renders the method also suitable for recording operations in which contiguous areas with the optically detectable changes are obtained by means of short radiation pulses succeeding each other with short intervals. This is in contrast to the method known from U.S. Pat. No. 4,894,816. In the method of that patent the initial value of the radiation pulse is only dependent on the length of the directly preceding interval. In other words, the influence of the previous between the successive radiation pulses, this is a considerable influence.

Another embodiment of the method which can be easily realized is characterized in that the aforementioned adapted control signal is obtained by means of a convolution of a signal related to the bivalent square-wave control signal and having a function whose signal values decreases as a function of time. An optimum compensation is obtained in a method which is characterized in that the time function is an exponentially decreasing function. In fact, the influence of a radiation pulse on the temperature at the scanning area appears to decrease substantially exponentially as a function of the elapsed time.

BRIEF DESCRIPTION OF THE DRAWINGS

These and other aspects of the invention will be apparent from and elucidated with reference to the embodiments described hereinafter and the following drawings, in which

FIG. 5b shows the temperature variation at the scanning area, associated with the radiation variation shown in FIG. 5a;

DESCRIPTION OF THE PREFERRED EMBODIMENTS

Figure 1:
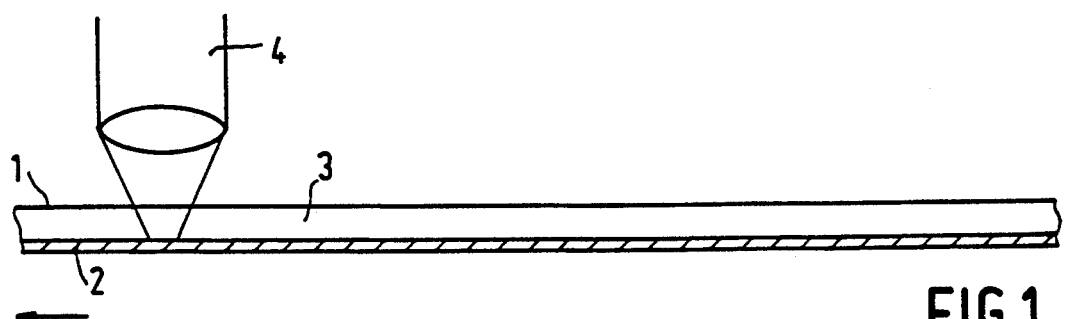
FIGS. 1 and 3b show a record carrier for use with a method according to the invention.

FIG. 1 shows a record carrier 1 having a recording layer 2 which is provided on a substrate 3 of, for example, transparent material. The recording layer 2 is of a conventional type which undergoes an optically detectable changed when it is heated above a write temperature. The recording layer 2 may comprise a "phase-change" material in which the structure in an area can be changed from amorphous to crystalline, or conversely, by supplying heat. The recording layer 2 may also comprise a magneto-optical material in which a domain having an optically detectable change of magnetization can be provided by subjecting the material generally to the influence of a magnetic field and simultaneously heating the material locally.

The recording layer 2 can be heated by means of a radiation beam 4 whose power is high enough to heat the recording layer 2 above a write temperature. A pattern of areas having optically detectable changes can be provided by scanning the recording layer 2 with the radiation beam 4 and modulating the power in a pulsatory manner such that pulses having a power which is high enough to heat the scanned area above the write temperature alternate with intervals in which the power is insufficient to heat the scanned area above the write temperature. As a result, an information pattern having areas which have optically detectable changes alternating with unchanged areas is provided in the recording layer 2. The areas with optically detectable changes will hereinafter be briefly referred to as effects. The magnitude of the effects is determined by the size of the area which is heated above the write temperature. The size of this area is considerably dependent on the temperature at the scanning area, which will be illustrated with reference to FIG. 2.

Figure 2:
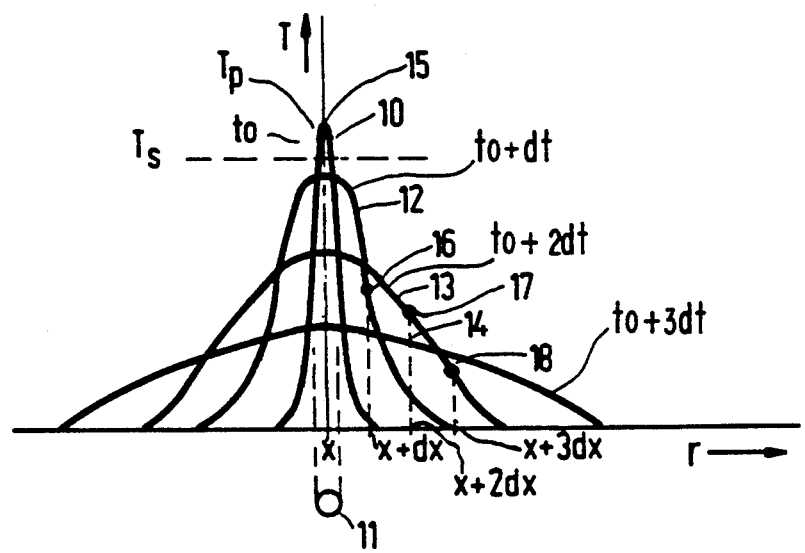
FIG. 2 shows the temperature variation within the recording layer of a record carrier as a result of a radiation pulse.

FIG. 2 shows the temperature variation in the recording layer 2 as a function of the distance r to the center of the scanning point at different instants, if the recording layer 2 is heated by means of a short radiation pulse. The curve of reference numeral 10 denotes the temperature variation as a function of r at the instant t0 at the end of radiation pulse. The portion of the recording layer at a temperature above the write temperature Ts undergoes an optically detectable change. The effect obtained is denoted by reference numeral 11. The heat applied to the recording layer 2 spreads over the recording layer 2, and, as a result that the temperature at the location of the scanning area decreases and the temperature in the vicinity of the scanning area increases. The temperature variations as a function of r at the equidistant instants t0+dt, t0+2.dt and t0+3.dt are denoted by the curves of reference numerals 12, 13 and 14, respectively.

The magnitude of the effect is determined by the magnitude of the area heated above the write temperature Ts. The size of this area generally increases when the temperature Tp at the location of the center of the scanned portion of the recording layer 2 increases. This center will be further referred to as the scanning center.

The temperature Tp is determined by the initial temperature of the recording layer 2 which directly precedes a radiation pulse, supplemented with the temperature rise as a result of the radiation pulse. The initial temperature is influenced by the variation of the radiation power in the directly preceding time interval. This influence will be illustrated with reference to FIGS. 3a and 3b.

Figure 3A:
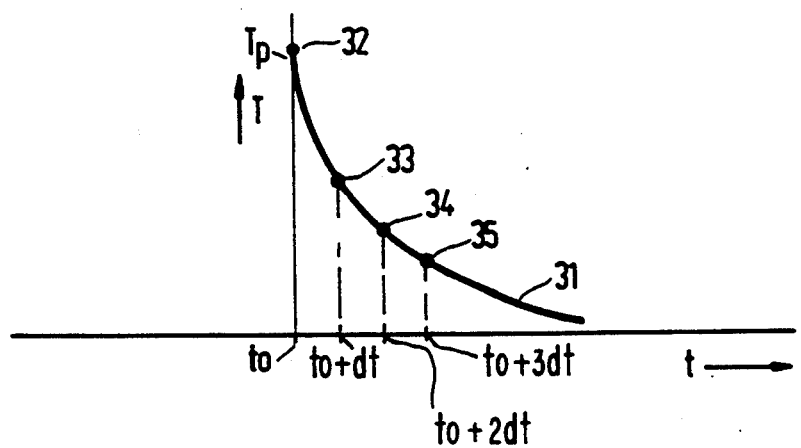
FIG. 3a shows the temperature at a scanning area as a result of a radiation pulse.
Figure 3B:
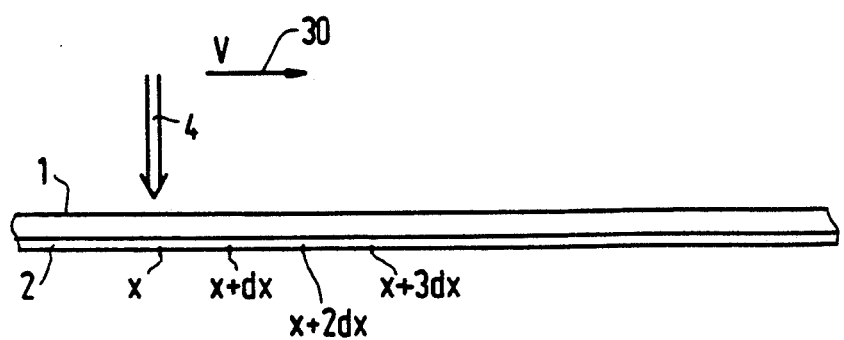

FIG. 3b shows the scanning radiation beam 4 which moves at a constant rate v with respect to the recording layer 2 in the direction denoted by an arrow 30. At instant t0 the radiation beam 4 is in position x. At this instant the radiation power is increased for a short time so that the temperature in the center of the scanned area rises to Tp. In FIG. 2, this temperature is denoted by a dot 15 on the curve 10. The heat applied to the recording layer subsequently spreads across the record carrier. At the instant t0+dt, when the radiation beam scans position x+dx, the recording layer is heated in situ to a value which is denoted by a dot 16 on the curve 12 in FIG. 2. The temperatures at the instants t0+2.dt and t0+3.dt, when the radiation beam 4 scans the positions x+2.dx and x+3.dx respectively, are denoted in FIG. 2 by dots 17 and 18, respectively.

FIG. 3a shows the associated variation of the temperature T as a function of time (t) by means of a curve 31. The dots 32, 33, 34 and 35 on the curve 31 correspond to the dots 15, 16, 17 and 18 respectively, in FIG. 2. The curve 31 in FIG. 3a can be satisfactorily approximated by an exponentially decreasing function having a time constant which approximately decreases at an increasing scanning rate in accordance with a quadratic function of the scanning rate v.

Figure 4A:
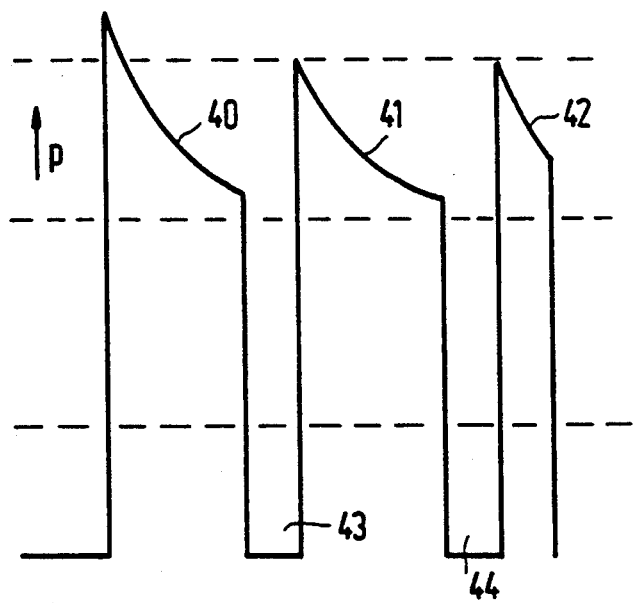
FIG. 4a shows the variation of the radiation power of a radiation beam in a known recording method.
Figure 4B:
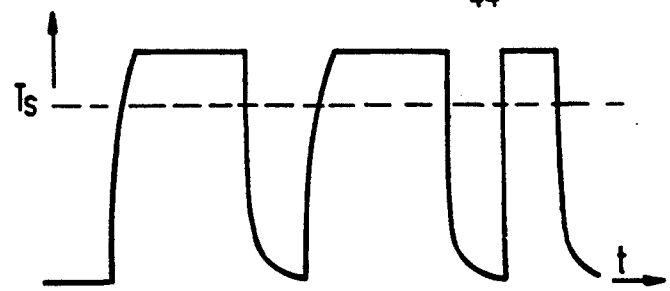
FIG. 4b shows the temperature variation at the scanning area associated with the known method.

FIG. 4a shows the pulsatory variation of the radiation power P in the prior-art method as described in U.S. Pat. No. 4,894,816. The reference numerals 40, 41 and 42 denote the different radiation pulses. During the radiation pulses the power decreases in order to compensate for the temperature rise resulting from the transport of heat previously applied to the scanning area. Consequently, the temperature in the scanning center is maintained constant. In FIG. 4b, the temperature T is shown as a function of time t at the location of the scanning point. In the intervals denoted by the reference numerals 43 and 44, the power of the radiation beam is maintained constant at a low level. The temperature in the scanning center decreases as a function of time. The temperature directly before the start of a subsequent pulse depends on the length of the interval. Because it is desirable that the temperature is equal for all effects when applying the effects, the temperature difference to be bridged at the start of the radiation pulse is dependent on the temperature directly before the radiation pulse and is, thus, dependent on the length of the previous interval. In the prior-art method, the power at the start of the radiation pulse is, therefore, set in dependence upon the length of the interval. This means that the power at the start of a radiation pulse subsequent to a long interval is considerably larger than the power at the start of a radiation pulse subsequent to a short interval.

Figure 5A:
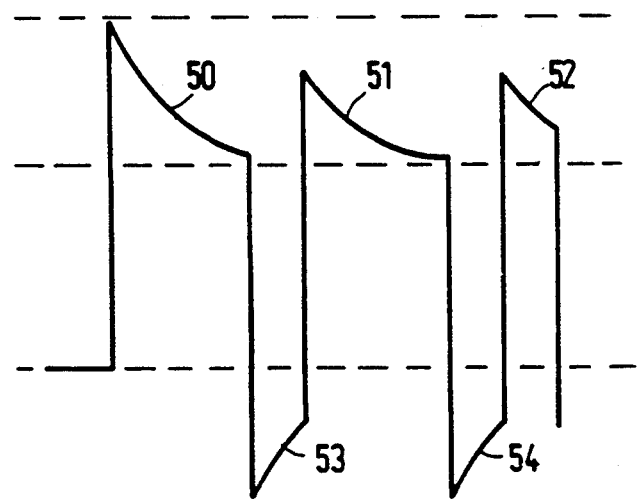
FIGS. 5a and 6 show the variation of the radiation power of a radiation beam in an embodiment of a recording method according to the invention.
Figure 5B:
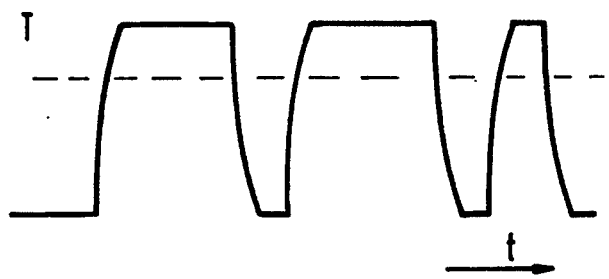

FIG. 5a shows the pulsatory variation of the power P of the radiation beam in an embodiment of the method according to the invention. The radiation pulses are denoted by the reference numerals 50, 51 and 52, while the intervals are denoted by the reference numerals 53 and 54. FIG. 5b shows the associated variation of the temperature T in the scanning center. The power P in the intervals increases as a function of time t. The power variation in the intervals is chosen to be such that the temperature in the scanning center remains substantially constant. As a result, the initial temperature at the end of the interval is higher than in the prior-art method, which means that the power of the radiation pulse has a lower initial value. In the embodiment shown, the temperature in the scanning center of the intervals is maintained as a constant. It will be obvious to those skilled in the art that the reduction of the initial value is also obtained when the variation of the radiation power in the intervals increases, which does not lead to a constant temperature.

For the positive effect on the initial value of the power in the radiation pulses, it is essential that the decrease of temperature is at least partly inhibited. In principle, a decrease in temperature is allowed when the temperature at the end of the interval is higher than at the start, provided that it remains sufficiently far below the write temperature Ts at the end of this interval. A constant temperature throughout the interval is optimal. Due to the fact that the temperature has not further decreased, a relatively low initial value is then sufficient, while it is guaranteed that the temperature is below the write temperature at the end of the interval.

In the method according to the invention, the initial value of the power in the radiation pulse can be set in dependence upon the length of the previous interval in a manner which is similar to the manner known from U.S. Pat. No. 4,894,816 while the power in the intervals increases in accordance with an exponential function. Furthermore, it has been observed that with this recording mode, the time constant of the power decrease in the pulse and the time constant of the power increase in the interval can be chosen to be exactly equal for recording, and the length of the effects as well as of the intervals will reach exactly the correct dimensions.

Prior to recording, it is common practice to generate a bivalent square-wave control signal in which the first signal level (the time intervals in which) indicates the temperature in the scanned portion should be heated above the write temperature and the other signal level indicates (the time intervals in which) the temperature in the scanned portion should remain below the write temperature. That being the case, it is preferable to determine a measure (i.e., a signal, hereinafter referred to as an adaption signal, indicative) of the influence of the variation of the radiation power on the temperature in the scanning center on the basis of that bivalent square-wave control signal. That bivalent square-wave control signal is then adapted by means of the adaptation signal determined to provide an adapted control signal.

In accordance with the method of the invention, the instantaneous power of the radiation beam during scanning is set at each instant to a value which corresponds to the instantaneous signal value of the adapted control signal. In this way, substantially complete compensation can be obtained for the effect of the previous variation of the power of the scanning beam on the temperature in the scanning center.

The adaptation values (i.e., the adaption signal) can be obtained by performing a convolution of the adapted control signal with the function shown in FIG. 3a. Such a convolution can be represented by the following relationship:

$$g(t) = i(t) - a(t) \tag{Eq. 1}$$

$$a(t) = \int_{-\infty}^{t} h(t)g(t - \tau)d\tau \tag{Eq. 2}$$

wherein:
i(t) is the bivalent square-wave control signal,
h(t) is the function shown in FIG. 3a,
g(t) is the adapted control signal and
a(t) is the adaptation signal.

Figure 10:
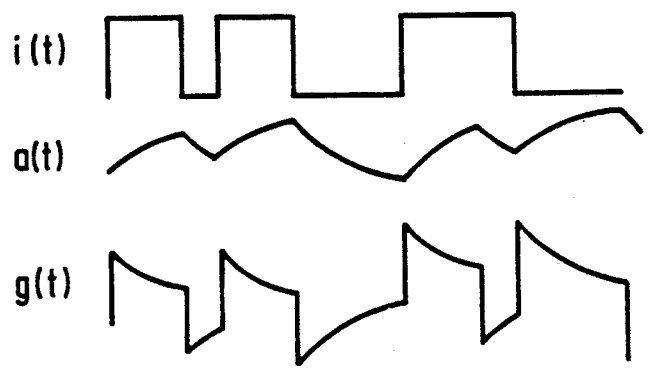
FIG. 10 shows a number of signals as a function of time to illustrate the invention.

For the purpose of illustration, FIG. 10 shows the signals i(t), a(t) and g(t) as a function of time. It is alternatively possible to determine the adaptation signal by means of a convolution of the bivalent square-wave control signal i(t) and a function h(t) which can be derived from h(t) and which is approximately equal to the function h(t) for small adaptation values.

Figure 6:
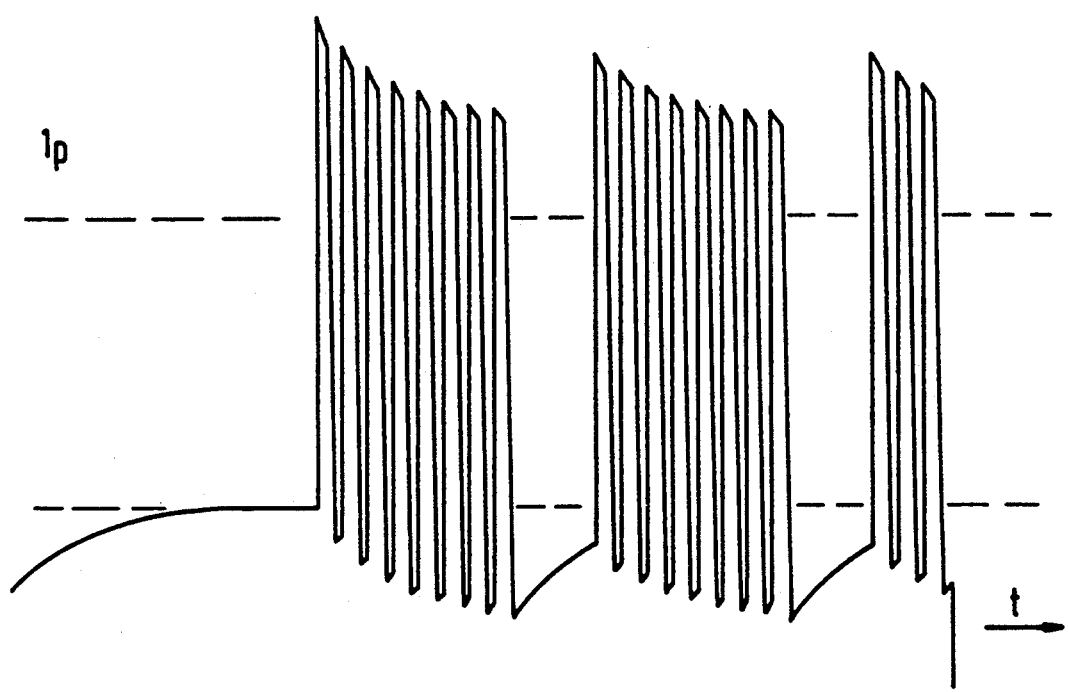

The embodiments of the recording method according to the invention in which the initial power is adapted on the basis of convolutions is also very suitable for recording operations in which, not one uninterrupted radiation pulse is generated for providing a single effect but, a single effect is provided by a series of short radiation pulses succeeding each other with short intervals. For the purpose of illustration such a radiation pattern is shown in FIG. 6.

Figure 7:
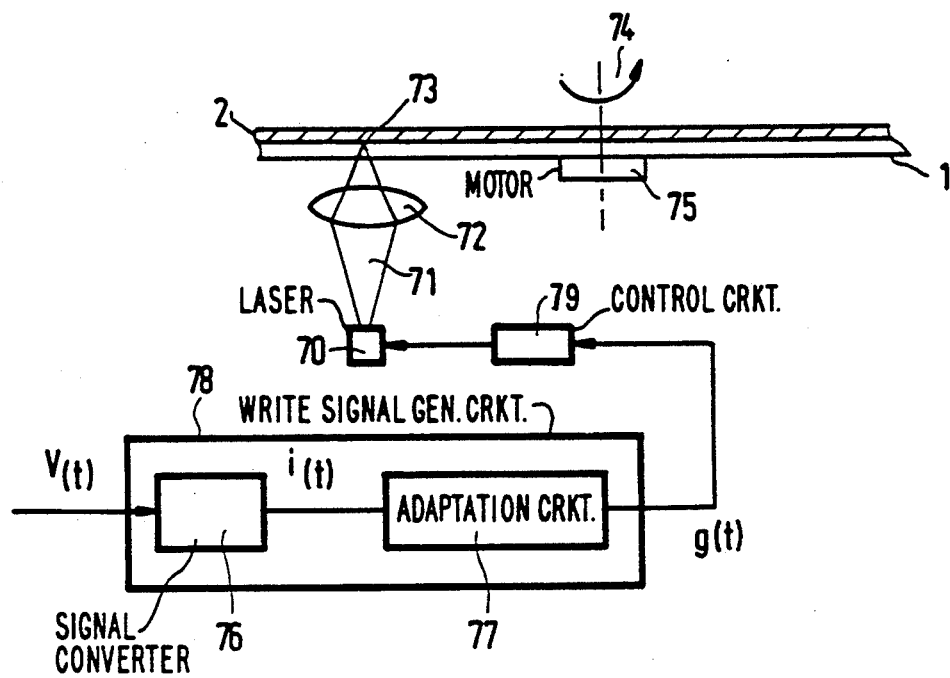
FIG. 7 shows an embodiment of a device according to the invention.

FIG. 7 shows an embodiment of a device according to the invention. The device comprises a radiation source in the form of, for example, a semiconductor laser 70. The semiconductor laser 70 generates a radiation beam 71 which is directed onto the recording layer 2 of the record carrier 1 via an objective 72. The radiation beam 71 is focused to a small scanning spot 73 on the recording layer 2. To realized scanning of the recording layer 2, the record carrier 1 is rotated about a shaft 74 by means of a motor 75.

The device further comprises a write signal generating circuit 78 of a conventional type with which a presented information signal v(t) is converted into a write signal (i.e., an adapted control signal g(t). The circuit 78 comprises a signal converter 76 for converting the information signal v(t) into a bivalent square-wave control signal i(t). The circuit 76 may comprise, for example a 2/7 modulator which converts the information signal v(t) into a 2/7-modulated signal. However, such a circuit 78 may alternatively comprise an EFM modulator as is used for recording CD signals. An adaptation circuit 77 converts the bivalent square-wave control signal i(t) into the write signal g(t). A control circuit 79 of a conventional type sets the instantaneous power of the radiation beam at each instant to a value which is fixed by the instantaneous signal value of the write signal g(t).

The adaptation circuit 77 derives the write signal g(t) by adapting the bivalent square-wave control signal i(t). A decrease of the signal values of the write signal g(t) in the pulses and an increase of the signal values of the write signal g(t) in the intervals are realized.

Figure 8:
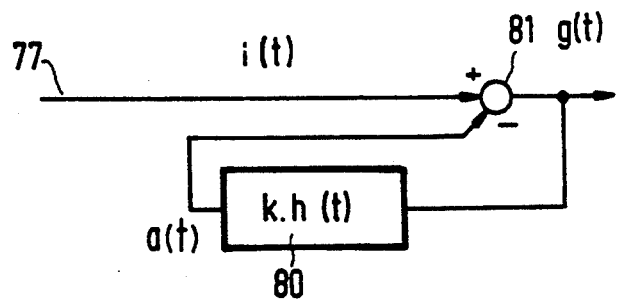
FIGS. 8 and 9 show embodiments of circuits used in the device according to the invention.

FIG. 8 shows an embodiment of the circuit 77. This embodiment comprises a circuit 80 for determining the adaptation signal a(t), preferably by performing a convolution between the write signal g(t) and the function h(t). However, other ways of determining the adaptation signal a(t) are alternatively possible. For example, it is possible to perform the adaptation of the write signal g(t) in a way which corresponds to the way described in U.S. Pat. No. 4,894,816.

The circuit 80 of FIG. 8 may consist of an analog circuit with a pulse response k.h(t). The function k.h(t) can be satisfactorily approximated by a first-order low-pass filter. Instead of using an analog circuit for the convolution, the convolution may alternatively be performed with digital circuits which may be implemented as hard-wired circuits or program-control circuits. The output of the circuit 80 supplies the adaptation signal a(t). The write signal g(t) is derived from the bivalent square-wave control signal i(t) and the adaptation signal a(t) by means of a combination circuit 81 of a conventional type, for example, a differential amplifier.

Figure 9:
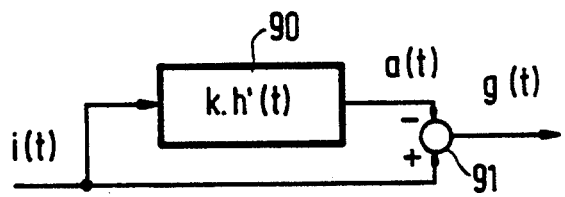

FIG. 9 shows a further embodiment of the circuit 77 in which the adaptation signal a(t) is determined by performing a convolution between the bivalent square-wave control signal i(t) and a function k.h'(t). The convolution is performed by means of a circuit 90. The adaptation signal a(t) is are subtracted from the bivalent square-wave control signal i(t) by means of a differential amplifier 91. The write signal g(t) can be derived again from the output of the differential amplifier.

The above-described embodiments of a device according to the invention are suitable for recording operations in which the scanning rate is constant. However, the scanning rate is often not constant as in, for example, recording operations in which the recording layer of a rotating disc-shaped record carrier is scanned with a constant angular velocity. It is to be noted that the time constant of the functions h(t) and h'(t) are dependent on the scanning rate in accordance with an approximately quadratic function.

The recording operations at which the scanning rate is not constant may simply be adapted to the changing scanning rate by adapting the function h(t) used for the convolution of the bivalent square-wave signal i(t) in dependence upon a rate signal which is indicative of the scanning rate. Such an adaptation can easily be realized by using a low-pass filter having adjustable time constants. The rate signal can be simply derived from the rotation frequency of the record carrier and the radial scanning position, the last-mentioned quantity being fixed, for example, by the address of the scanned portion. It is alternatively possible to derive this radial position from the radial position of the scanning head by means of a position detector.

The invention has been illustrated hereinbefore for a recording method in which the effects are exclusively produced by radiation pulses. During the intervals the temperature decreases below the write temperature so that there are no changes in the recording layer in the intervals. However, the invention is equally suitable for recording in recording layers of the "direct-overwrite" type in which an effect of a first type can be provided by heating the layer up to a first high temperature level, and in which effects of a second type, to be distinguished from the effects of the first type, can be provided by heating the layer to a second, low temperature level. Such recording layers are known, inter alia from "Japanese Journal of Applied Physics" vol. 28, supplement 28-3, pp. 367–370 and pp. 371–374. The recording layers described in that journal relates to record carriers having an exchange-coupled multilayered magneto-optical film. In such a direct-overwrite recording layer, an information pattern of effects of the first and second types can be obtained by alternately heating the recording layer at the scanning area to the high temperature level and the low temperature level by means of a radiation beam having an intensity variation as is shown in FIGS. 5a or 6.

We claim:

1. A method of recording information on a record carrier having a recording layer in which an optically detectable change is realized by heating said layer, the method comprising:
scanning said layer by means of a radiation beam having a power; and
modulating the power of said radiation beam in a pulse pattern related to the information to be recorded, said pulse pattern having pulses of high power relative to and alternating with intervals of low power, the power wherein during each of the pulses decreases and during each of the intervals increases.

2. The method as claimed in claim 1, wherein the power (i) decreases during each of the pulses so as to maintain a substantially uniform first temperature at a scanning area of said layer during that pulse, and (ii) increases during each of the intervals so as to maintain a substantially uniform second temperature at the scanning area of said layer during that interval, said first temperature and said second temperatures being different.

3. The method as claimed in claim 2, wherein said first temperature is sufficient to bring about said optically detectable change in said layer, and said second temperature is insufficient to bring about said optically detectable change in said layer.

4. The method as claimed in claim 1, wherein the power (i) during each of the pulses is sufficient to bring about said optically detectable change in scanning area of said layer during that pulse, and (ii) during each of the intervals is insufficient to bring about said optically detectable change in the scanning area of said layer during that interval.

5. The method as claimed in claim 1, wherein the power (i) during each of the pulses decreases in accordance with a first exponential function, and (ii) during each of the intervals increases in accordance with a second exponential function.

6. The method as claimed in claim 5, wherein said first exponential function and said second exponential function have a same time constant.

7. The method as claimed in claim 1, further comprising:
   generating a bivalent square-wave control signal for setting the power of said radiation beam;
   determining an adaption signal corresponding to a measure of an influence of variation of the power on the temperature at a scanning area of said layer on the basis of said bivalent square-wave control signal;
   adapting said bivalent square-wave control signal in dependence upon said adaption signal to form an adapted control signal having signal values; and
   setting the power of said radiation beam to values corresponding to the signal values of said adapted control signal.

8. The method as claimed in claim 7, wherein said adapted control signal is determined by subtracting said adaption signal from said bivalent square-wave control signal.

9. The method as claimed in claim 7, wherein said adaption signal corresponds to a convolution of said bivalent square-wave control signal with a time function having a decreasing amplitude.

10. The method as claimed in claim 9, wherein said time function is an exponentially decreasing function.

11. The method as claimed in claim 7, wherein said adaption signal corresponds to a convolution of said adapted control signal and a time function having a decreasing amplitude.

12. The method as claimed in claim 11, wherein said time function is an exponentially decreasing function.

13. A device for recording information on a record carrier having a recording layer in which an optically detectable change is realized by heating said layer, the device comprising:
   scanning means for scanning said recording layer by means of a radiation beam having a power;
   generating means for converting an information signal into a write signal of signal values having a pulse pattern having pulses of high signal values relative to and alternating with intervals of low signal values, wherein the high signal values decrease during each of the pulses and the low signal values increase during each of the intervals; and
   control means for setting the power of said radiation beam to values which correspond to the high and low signal values of said write signal.

14. The device as claimed in claim 13, wherein said generating means comprises:
   conversion means for converting said information signal into a bivalent square-wave control signal;
   determining means for determining an adaption signal corresponding to a measure of an influence of variation of the power on a temperature at a scanning area of said layer on the basis of said bivalent square-wave control signal; and
   adaption means for adapting said bivalent square-wave control signal in dependence upon said adaption signal to form said write signal.

15. The device as claimed in claim 14, where said adaption means comprises means for subtracting said adaption signal from said bivalent square-wave control signal to form said write signal.

16. The device as claimed in claim 14, wherein said determining means comprises convolution means for convoluting said bivalent square-wave control signal and a time function with a decreasing amplitude to determine said adaption signal.

17. The device as claimed in claim 16, wherein said time function is an exponentially decreasing function.

18. The device as claimed in claim 16, wherein said convolution means comprises a low-pass filter having a pulse response which corresponds to said time function.

19. The device as claimed in claim 13, wherein said generating means comprises:
   conversion means for converting said information signal into a bivalent square-wave control signal; and
   adaption means for adapting said bivalent square-wave control into said write signal.

20. The device as claimed in claim 19, wherein said adaption means comprises convolution means for convoluting said write signal with a time function having a decreasing amplitude to produce an adaption signal corresponding to a measure of an influence of variation of the power on a temperature at a scanning area of said layer on the basis of said bivalent square-wave signal.

21. The method as claimed in claim 20, wherein said time function is an exponentially decreasing function.

22. The device as claimed in claim 20, wherein said convolution means comprises a low-pass filter having a pulse response which corresponds to said time function.

23. The device as claimed in claim 22, wherein said control means sets the power of said radiation beam to values which (i) decrease in accordance with each of the pulses of said write signal and thereby maintain a substantially uniform first temperature at the scanning area of said layer for that pulse, and (ii) increase in accordance with each of the intervals of said write signal and thereby maintain a substantially uniform second temperature at the scanning area of said layer during that interval.

24. The device as claimed in claim 23, wherein said first temperature is sufficient to bring about said optically detectable change in said layer, and said second temperature is insufficient to bring about said optically detectable change in said layer.

25. The device as claimed in claim 22, wherein said control means sets the power of said radiation beam to values which (i) are sufficient to bring about said optically detectable change at the scanning area of said layer in response to each of the pulses of said write signal and (ii) are insufficient to bring about said optically detectable changes at the scanning area of said layer in response to each of the intervals of said write signal.

26. The device as claimed in claim 22, wherein the high signal values within each of the pulses decrease in accordance with a first exponential function, and the low signal values within each of the intervals increase in accordance with a second exponential function.

27. The device as claimed in claim 26, wherein said first exponential function and said second exponential function have a same time constant.

* * * * *